No. 805,237. PATENTED NOV. 21, 1905.
W. T. SEARS.
SELF CLEANING AIR SCREEN VALVE.
APPLICATION FILED FEB. 18, 1905.

2 SHEETS—SHEET 1.

Witnesses:
Hamilton D. Turner
Titus N. Ives.

Inventor:
Willard T. Sears.
by his Attorneys,
Howson & Howson

No. 805,237. PATENTED NOV. 21, 1905.
W. T. SEARS.
SELF CLEANING AIR SCREEN VALVE.
APPLICATION FILED FEB. 18, 1905.
2 SHEETS—SHEET 2.
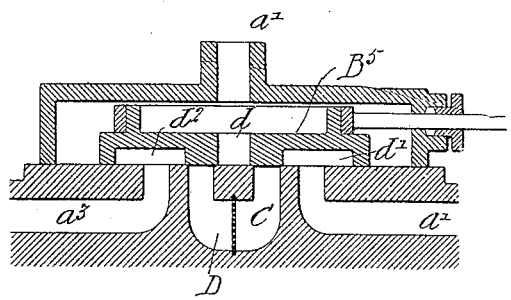
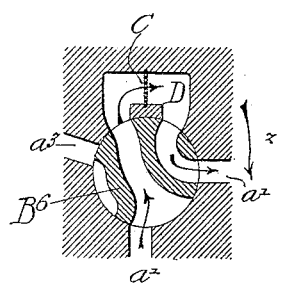 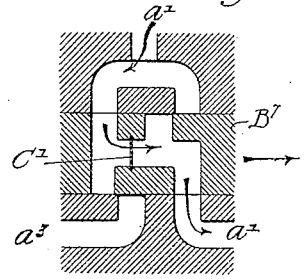
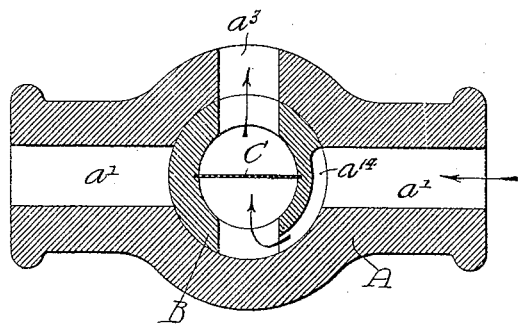
Witnesses:
Hamilton D. Turner
Titus N. Ives
Inventor:
Willard T. Sears
by his Attorneys
Howson & Howson

UNITED STATES PATENT OFFICE.

WILLARD T. SEARS, OF HARRISBURG, PENNSYLVANIA.

SELF-CLEANING AIR-SCREEN VALVE.

No. 805,237.      Specification of Letters Patent.      Patented Nov. 21, 1905.

Application filed February 18, 1905. Serial No. 246,209.

*To all whom it may concern:*

Be it known that I, WILLARD T. SEARS, a citizen of the United States, residing in Harrisburg, Pennsylvania, have invented certain Improvements in Self-Cleaning Air-Screen Valves, of which the following is a specification.

My invention consists of a novel structure, including a screen and a valve therefor, whereby the direction of flow of the fluid through the screen may be reversed at will, and thereby caused to remove particles of foreign matter which have lodged upon the screen, discharging them into the atmosphere or into a suitable receptacle, the object of the invention being to provide a relatively simple screen structure which may be quickly and conveniently cleaned when desired by the operation of a valve or equivalent structure. This object I attain as hereinafter set forth, reference being had to accompanying drawings, in which—

Figure 2:
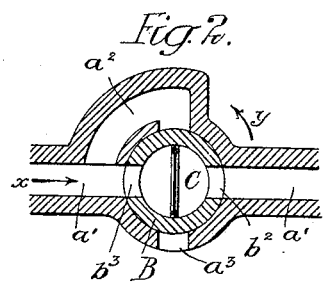
Figure 3:
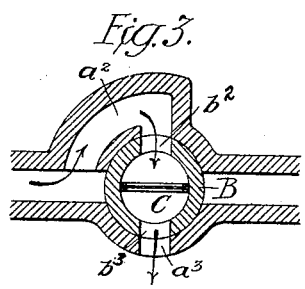
Figure 1:
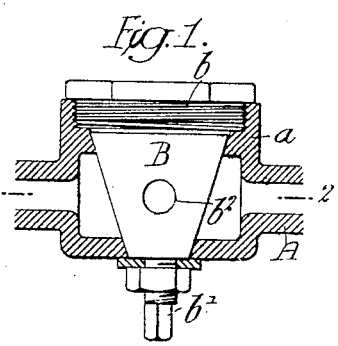
Figure 5:
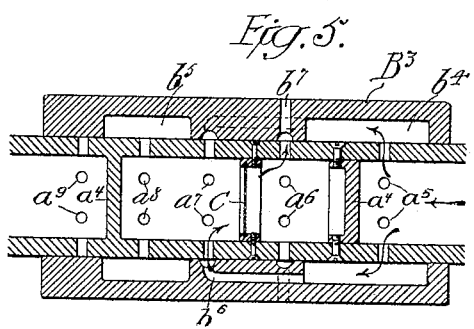
Figure 4:
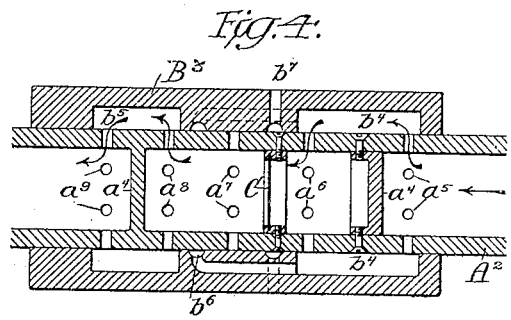
Figure 8:
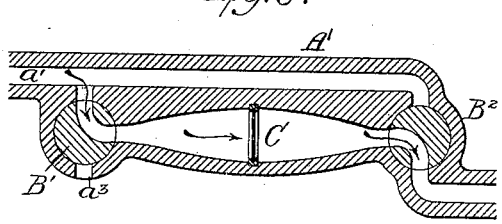
Figure 9:
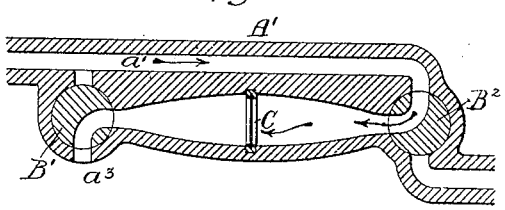
Figure 6:
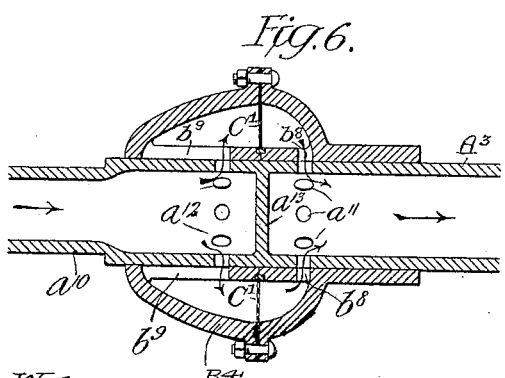
Figure 7:
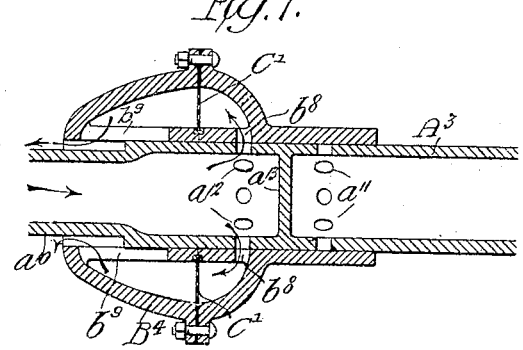

Figure 1 is a side elevation, partly in section, of one form of my invention, showing a casing and a screen-carrying valve therein. Figs. 2 and 3 are horizontal sections taken on the line 2 2, Fig. 1, and respectively illustrating the screen in its normal position and in the position which it occupies while being cleaned, the valve in this device being of the plug type. Figs. 4 and 5 are vertical sections of another form of my invention in which the valve for changing the direction of flow of current of the fluid is of the sliding cylindrical type, the screen being stationary. Figs. 6 and 7 illustrate a form of my invention in which, as in the construction shown in Figs. 4 and 5, the valve is of the sliding type, though the screen moves with the valve. Figs. 8 and 9 are horizontal sections of another form of my invention in which the screen is stationary and the direction of flow of fluid through said screen is controlled by two plug-valves. Fig. 10 is a vertical section of my invention, showing it as constructed in a form not unlike that of the ordinary engine slide-valve, the screen being stationary. Fig. 11 is a vertical section of a form of the invention in which the screen is stationary, the valve having through it three passages so placed that by turning the valve through a small angle the direction of the flow of air-current through the screen may be reversed. Fig. 12 is a vertical section of a form of my invention in which the screen is carried by a chambered slide-valve; and Fig. 13 is another form of my device somewhat similar to that shown in Figs. 1 to 3, inclusive, but differing therefrom in having an auxiliary air-passage formed in the valve instead of in the valve casing or conduit.

Referring to Figs. 1 to 3, inclusive, A represents a portion of a conduit or conductor for fluid under pressure, such as air or gas, having an enlarged portion, as shown, provided with a chamber in which operates a plug-valve B. In the present instance this valve is substantially conical in form and has a cap or cover $b$ threaded into a suitable recess of the casing $a$. Said valve may be turned on its axis by means of a square-ended spindle $b'$ and is also provided with a screen C, held in any desired manner within it and interposed between two openings $b^2$ and $b^3$ in its sides. By an inspection of Figs. 2 and 3 it will be seen that the casing $a$, in addition to the through or straight passage-way $a'$ in the line in which the valve B is interposed, is provided with a second passage $a^2$, connecting one portion of the passage $a'$ with the chamber containing said valve at a point preferably ninety degrees distant from the point at which said passage $a'$ enters. There is also an opening $a^3$ in the wall of the casing $a$, opposite the point of entrance of the passage $a^2$ into the valve-chamber, connecting the interior of said casing with the atmosphere. As will be seen from Fig. 2, under ordinary working conditions air, gas, or other fluid is free to flow through the passage $a'$ in the direction indicated by the arrow $x$, it being necessary for said fluid to pass through the valve B and the screen C, so that any objectionable pieces of solid material are caught. Whenever desired, the valve B may be turned to the position shown in Fig. 3, so as to place the two openings $b^2$ and $b^3$ in line with the end of the passage $a^2$ and the opening $a^3$, it being understood that in doing this the valve is turned in the direction indicated by the arrow $y$. Under these conditions pieces of solid material which have found lodgment upon the screen C or within the cavity of the valve B are forcibly blown out of the opening $a^3$, after which the valve may be returned to its normal position.

In the form of the invention shown in Figs. 8 and 9 I have provided two valves B' and B², placing them in suitable chambers in a casing A' and providing them with passages opening at points upon their surfaces ninety degrees distant from each other. Suitable passage-ways are constructed to coact with the openings through the valves, and a screen C is interposed in an enlarged cavity between the valves. The valve B' has opening into its chamber the passage or chamber containing the screen C, the air-supply passage $a'$, and the passage $a^3$, communicating with the atmosphere, while the valve B² communicates with the screen-chamber and with both ends of the passage $a'$. Under normal operating conditions fluid passes from passage $a'$ through valve B', as shown in Fig. 8, through screen C, and valve B². When, however, it is desired to clean the screen, the valves are turned into the position shown in Fig. 9, when the fluid passes from passage $a'$ through valve B², screen C, valve B', and passage $a^3$ into the atmosphere.

In Figs. 4 and 5 there is but a single valve B³, and this is of the sliding type. The main conduit A² is provided with two partitions $a^4$, between which the screen C is interposed. The movable portion of the structure, which is of cylindrical form, is constructed to slide upon said conduit A² and is provided with two annular chambers $b^4$ and $b^5$, as well as with two annular ports. One of these, $b^7$, communicates with the atmosphere, while the second, $b^6$, communicates with the annular chamber $b^4$ through suitable sets of ports $a^5$ to $a^9$, inclusive, extending through the walls of the conduit A², these sets being respectively arranged in planes at right angles to the line of said conduit. With the valve in the position shown in Fig. 4 fluid entering in the direction of the arrow passes through ports $a^5$ into chamber $b^4$ of the valve B³, through ports $a^6$ into the interior of the conduit, through the screen C, ports $a^8$, chamber $b^5$, and ports $a^9$ into the conduit again, the foreign material being, as before, caught on the screen C. When, however, the valve B³ is moved into the position shown in Fig. 5, the fluid passing through ports $a^5$ into the chamber $a^4$ is forced to flow through the passages into the ports $b^6$ and so into the interior of the conduit, subsequently passing through the screen in a direction the reverse of that existing under normal conditions through opening $a^6$ and ports $b^7$ into the atmosphere. In this instance the screen C is stationary; but if it be desired that this shall move with the valve structure independently of the conduit this may be accomplished by the construction shown in Figs. 6 and 7. As before, the valve slides upon the outside of the conduit A³ and has within it but a single annular chamber, which, however, opens onto the interior surface of the valve at its ends through passages $b^8$ and $b^9$. The screen C' is, however, interposed in the valve-chamber between said two sets of openings, it being noted that the latter of these is elongated, while the conduit structure A³ is provided with a portion $a^{10}$ of less diameter than the remainder, so that when the valve B⁴ is moved into one of its extreme positions the openings $b^9$ connect the interior of the valve-chamber with the atmosphere. There are two sets of ports $a^{11}$ and $a^{12}$, opening through the walls of the conduit A³, and a partition $a^{13}$, extending across said conduit between said sets of openings or ports. With this arrangement of parts fluid moving in the conduit in the direction of the arrow in Fig. 6 is forced to flow through ports $a^{12}$ thereof, port $b^9$ of the valve into the valve-chamber, and through screen C', passing from thence through openings $b^8$, ports $a^{11}$, back into the conduit. When, however, it is desired to clean the screen, the valve is moved into the position shown in Fig. 7, so that the air passing through ports $a^{12}$ enters the ports $b^8$ of the valve, and after passing through the screen flows through the port $b^9$ to the atmosphere, carrying with it whatever foreign material may have lodged upon the screen C'.

In that form of the invention illustrated in Fig. 10 I have shown a valve B⁵ in its mid-position, so that the flow of air is cut off. However, if this valve be moved to the left the air-flow takes place through a central port $d$ of said valve through a cavity D in the structure to which the device is applied through the screen C, port $d'$ in the valve, and out the air-channel $a'$. Moving the valve B⁵ to the right a sufficient distance places its port $d$ in communication with the second opening of the cavity D, so that flow of air takes place through the screen C in a direction the reverse of that previously existing, such flow passing through port $d^2$ of the valve to the atmosphere by way of the channel $a^3$ in the supporting structure. Fig. 11 illustrates a somewhat similar arrangement of air-conducting passages in the fixed structure to which my invention is applied, though in this case the valve B⁶ is of the rotary instead of the sliding type. By turning it through a relatively small angle in the direction indicated by the arrow $z$ the air-current entering through the passage $a'$ is reversed as to its direction of travel through the screen C, and the solid particles lodged against said screen are discharged through the passage $a^3$.

In the construction shown by both the two last-mentioned figures the screen is stationary; but in the modification shown in Fig. 12 it is carried by the sliding-valve structure B⁷, which is provided with passages coöperating with four passages, each two of which open on opposite sides of the structure surrounding the valve. As previously described in connection with the other forms of my device, the movement of the valve from the position shown through a relatively small distance to the right causes the air-current to be cut off from its exit-passage $a'$ and after causing it to pass through the screen C' in a direction the reverse of its normal flow permits it to discharge particles of foreign matter lodged upon the screen through the passage $a^3$.

The form of my invention shown in Fig. 13 operates in a manner identical with that described in connection with Figs. 1 to 3, inclusive, though I have modified the construction, so that where in the three first described figures the auxiliary passage $a^2$ is formed in the valve-casing in this instance such passage is formed in the valve itself, as indicated at $a^{14}$, it being noted that in the illustration the valve is shown in a position in which the flow of air takes place through the screen in a direction to remove the particles of foreign matter therefrom.

I claim as my invention—

1. The combination of a conduit, a movable structure, and a screen carried by said structure independent of the walls thereof, there being an inlet and two outlets so arranged that when the movable structure is in one position, fluid in the conduit passes from the inlet in one direction through the screen to one of the outlets, and when said structure is in a second position said fluid passes through the screen in an opposite direction to the second outlet, substantially as described.

2. The combination of a conduit having main and auxiliary passages, a valve, and a screen carried within said valve transverse to the passage therethrough and independent of the outer walls thereof, the valve being movable to direct fluid either through the screen and the main passage, or through the screen in a reversed direction and through the auxiliary passage, substantially as described.

3. The combination of a conduit having a main passage and an auxiliary passage including a discharge-opening, a valve for the conduit, and a screen carried by the valve and in addition to the wall structure thereof, the valve being movable to direct fluid either through the screen and the main passage, or through the auxiliary passage, through the screen in a reverse direction and the discharge-opening, substantially as described.

4. The combination of a conduit having main and auxiliary passages, a valve for said conduit having a through-passage and a substantially plane screen transverse thereto, said valve being movable to direct fluid either through the main passage, or through the auxiliary passage and in a reversed direction through itself, substantially as described.

5. The combination of a conduit having an inlet and a main outlet, a single valve therefor, and a screen in addition to and functionally independent of the wall structures of said valve, the valve being constructed to either cause flow of fluid through the screen and the conduit in one direction, or flow from the conduit through the screen in a reverse direction, to a discharge-opening independent of the main outlet, substantially as described.

6. The combination of a conduit having main and auxiliary passages, there being also an opening for waste, a valve in the conduit having mounted in it a plane screen, said valve being movable so as to permit flow of fluid through the conduit, or from the conduit to the waste-opening, the direction of such flow through the screen being reversed in said two cases, substantially as described.

7. The combination of a casing having a main passage including a chamber, a valve in the chamber having a through-passage and a screen therein, there being an auxiliary passage from the conduit to said chamber and a waste-passage from the chamber, said valve being movable to connect either the two sections of the main passage, or the auxiliary and the waste passages, substantially as described.

8. The combination of a conduit having main and auxiliary passages, there being also an opening for waste, a revoluble valve in the conduit carrying a screen, said valve being movable so as to permit flow of fluid through the conduit or from the conduit through the auxiliary passage through the screen to the waste-opening, the direction of such flow through the screen being reversed in said two cases, substantially as described.

In testimony whereof I have signed my name to this specification in the presence of two subscribing witnesses.

WILLARD T. SEARS.

Witnesses:
Wm. E. Shupe,
Jos. H. Klein.